US008165866B2

(12) United States Patent
Cha et al.

(10) Patent No.: US 8,165,866 B2
(45) Date of Patent: Apr. 24, 2012

(54) EMULATION SYSTEM

(75) Inventors: Chi-Ho Cha, Hwaseong-si (KR);
Hoon-Sang Jin, Yongin-si (KR);
Jae-Geun Yun, Seongnam-si (KR)

(73) Assignee: Samsung Electronics Co., Ltd.,
Suwon-Si, Gyeonggi-Do (KR)

( * ) Notice: Subject to any disclaimer, the term of this patent is extended or adjusted under 35 U.S.C. 154(b) by 840 days.

(21) Appl. No.: 11/838,017

(22) Filed: Aug. 13, 2007

(65) Prior Publication Data

US 2008/0046228 A1 Feb. 21, 2008

(30) Foreign Application Priority Data

Aug. 17, 2006 (KR) .................. 10-2006-0077700

(51) Int. Cl.
*G06F 9/455* (2006.01)
(52) U.S. Cl. .......................................... 703/28
(58) Field of Classification Search .............. 703/28; 709/1
See application file for complete search history.

(56) References Cited

U.S. PATENT DOCUMENTS

| 7,072,825 | B2 * | 7/2006 | Wang et al. ............... 703/28 |
| 2002/0128812 | A1 * | 9/2002 | Gooding et al. .......... 703/23 |
| 2004/0078187 | A1 | 4/2004 | Reblewski |
| 2004/0210798 | A1 * | 10/2004 | Higashi ..................... 714/27 |
| 2005/0177331 | A1 * | 8/2005 | Shibata .................... 702/89 |
| 2006/0015313 | A1 * | 1/2006 | Wang et al. ............... 703/14 |

FOREIGN PATENT DOCUMENTS

| JP | 10-312369 | 11/1998 |
| JP | 11-015797 | 1/1999 |
| JP | 2002-538540 | 11/2002 |
| JP | 2002-358340 | 12/2002 |
| JP | 2004-054642 | 2/2004 |
| JP | 2005-050267 | 2/2005 |
| JP | 2005-285092 | 10/2005 |
| KR | 1020010067370 | 7/2001 |
| KR | 10020040069059 | 8/2004 |
| KR | 1020050059985 | 6/2005 |
| KR | 1020050113273 | 12/2005 |
| KR | 10-2006-0066634 | 6/2006 |

OTHER PUBLICATIONS

English Abstract Publication No. 1020060066634.
English Abstract for Publication No. 11-015797.
English Abstract for Publication No. 1020040069059.
English Abstract for Publication No. 2005-050267.
English Abstract for Publication No. 1020010067370.
English Abstract for Publication No. 1020050059985.
English Abstract for Publication No. 1020050113273.
English Abstract for Publication No.: 10-312389.
English Abstract for Publication No.: 2002-538540.
English Abstract for Publication No.: 2002-358340.
Kohei Hosokawa, et al., "A Functional Verification Method Connecting Multiple FPGA Emulators" Joho Shori Gakkai Shinpojiumu Ronbunshu, Journal Code: Y0978B, ISSN: 1344-0640, vol. 2006; No. 7; pp. 163-168 (2006).

* cited by examiner

*Primary Examiner* — Paul Rodriguez
*Assistant Examiner* — Bernard E Cothran
(74) *Attorney, Agent, or Firm* — F. Chau & Associates, LLC

(57) ABSTRACT

An emulation system includes a controller, an emulation calculator, an emulation storage unit, and an interface unit. The emulation calculator includes a device under test (DUT) and emulates the DUT. The emulation storage unit stores emulation data of the DUT emulated by the emulation calculator under the control of the controller. The interface unit distributes and transfers the emulation data to a plurality of computers under the control of the controller.

19 Claims, 9 Drawing Sheets

EMULATION SYSTEM

CROSS-REFERENCE TO RELATED APPLICATIONS

This U.S. non-provisional patent application claims priority under 35 U.S.C. §119 of Korean Patent Application No. 2006-77700, filed on Aug. 17, 2006, the entire contents of which are hereby incorporated by reference.

BACKGROUND OF THE INVENTION

1. Technical Field

The present disclosure relates to an emulation system, and more particularly, to an emulation system for distributed processing of emulation data.

2. Discussion of Related Art

Verification is essential for completion of digital circuits. The verification determines whether a design circuit is normal. When the design circuit is abnormal, debugging is performed to correct the abnormal design circuit to be normal. Typically, the verification is performed using a software simulation or a hardware emulator.

A simulation-based verification method is simple and inexpensive to perform, but needs a relatively large amount of time. On the other hand, an emulator-based verification method is complex and expensive to perform, but needs only a relatively small amount of time.

Typically, commercial emulation methods use a field-programmable gate array (FPGA). For verification of a design circuit, the FPGA needs an additional circuit for extracting the state value of an important net or an important flip-flop in the design circuit. In an FPGA-based verification method, all the state values extracted by the additional circuit are stored in an internal memory and the data stored in the memory are read out using a Joint Test Action Group (JTAG), upon completion of emulation.

In an emulation system, many simulation result data are transferred to a computer through only one high-speed computer interface. As the gate size of a device under test (DUT) increases, the amount of data needed for debugging increases. Therefore, in the emulation system, data transfer time increases with an increase in the data amount, which reduces an emulation speed.

Therefore a need exists for an emulation system for distributed processing of emulation data.

SUMMARY OF THE INVENTION

According to an embodiment of the present invention, an emulation system includes a controller, an emulation calculator including a user circuit and emulating the user circuit, an emulation storage unit storing emulation data of the user circuit emulated by the emulation calculator under the control of the controller, and an interface unit distributing and transferring the emulation data to a plurality of computers under the control of the controller.

According to an embodiment of the present invention, a computer readable medium embodying instructions executable by a processor performs a method for analyzing a device under test (DUT). The method includes storing emulation data of the DUT emulated by an emulation calculator under the control of a controller, and distributing and transferring the emulation data to a plurality of computers under the control of the controller, wherein the plurality of computers perform one of debugging and simulation.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to embodiments set forth herein. Rather, embodiments are provided so that this disclosure will be thorough and complete, and will fully convey the scope of the present invention to those skilled in the art.

Figure 1:
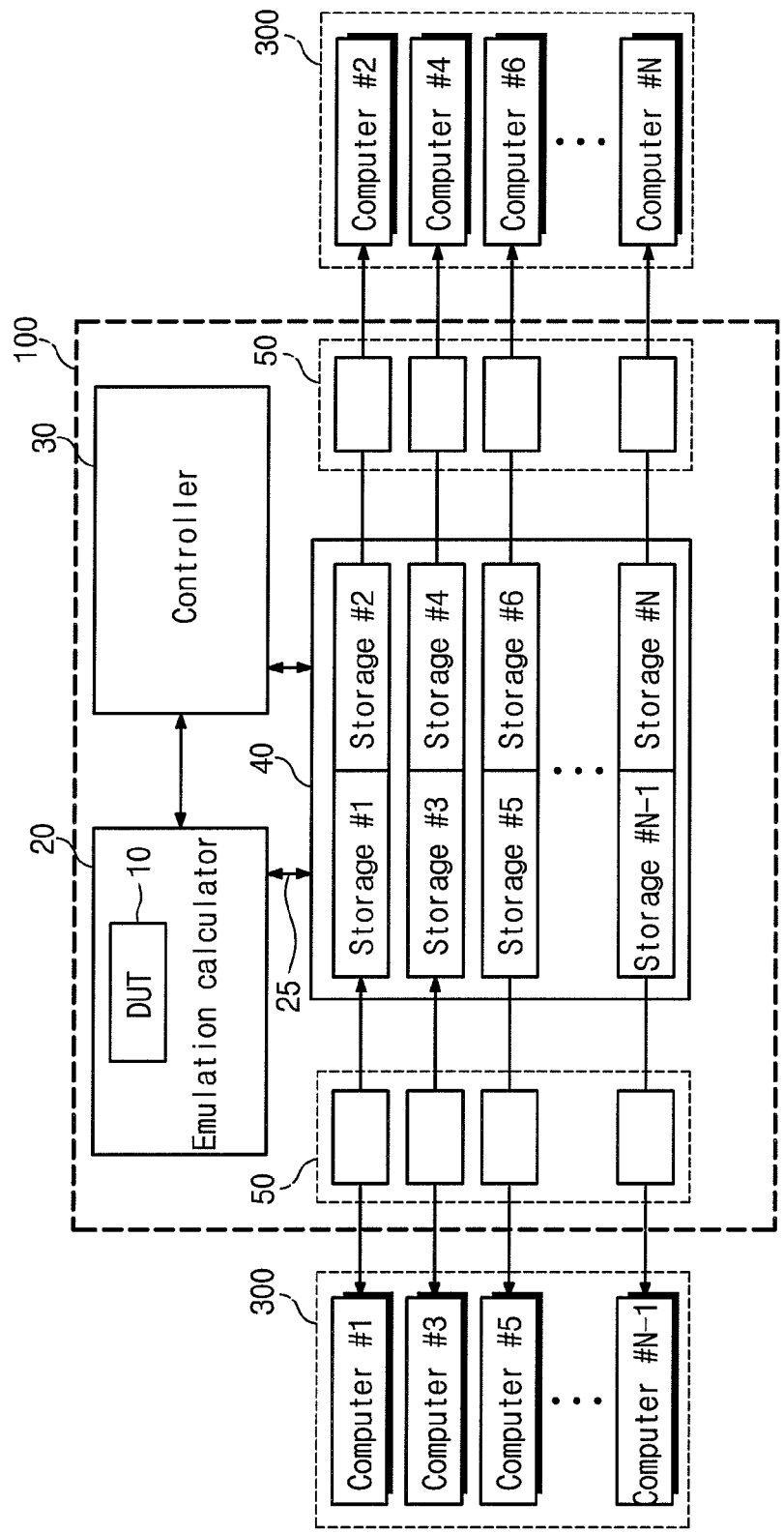
FIG. 1 is a block diagram of an emulation system according to an embodiment of the present invention.

FIG. 1 is a block diagram of an emulation system according to an embodiment of the present invention.

Referring to FIG. 1, an emulation system 100 includes an emulation calculator 20 with a DUT 10, a controller 30, an emulation storage unit 40, and an interface unit(s) 50. Emulation result data is distributed across a plurality of computers 300 for storage. In addition, the computers 300 store data corresponding to the DUT 10 in a hardware description language (HDL) format. Accordingly, the computer 300 receives emulation result data and performs debugging or simulation.

The emulation calculator 20 emulates the DUT 10 under the control of the controller 30, and stores the emulation result data in the emulation storage unit 40. The controller 30 transfers the emulation result data from the emulation storage unit 40 to the interface unit(s) 50. In addition, the controller 30 transfers the emulation result data stored in the interface unit(s) 50 to the computer 300.

Figure 2:
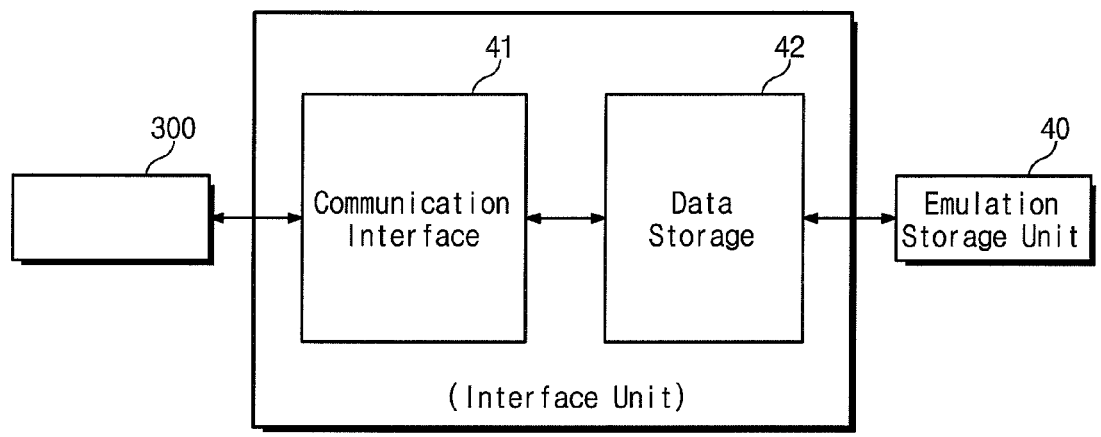
FIG. 2 is a block diagram of an interface unit illustrated in FIG. 1.

FIG. 2 is a block diagram of the interface unit 50 illustrated in FIG. 1.

Referring to FIG. 2, the interface unit 50 includes a communication interface 41 and a data storage 42. The emulation result data stored in the emulation storage unit 40 are temporarily stored in the data storage 42 and then transferred to the computer 300 through the communication interface 41.

Figure 3:
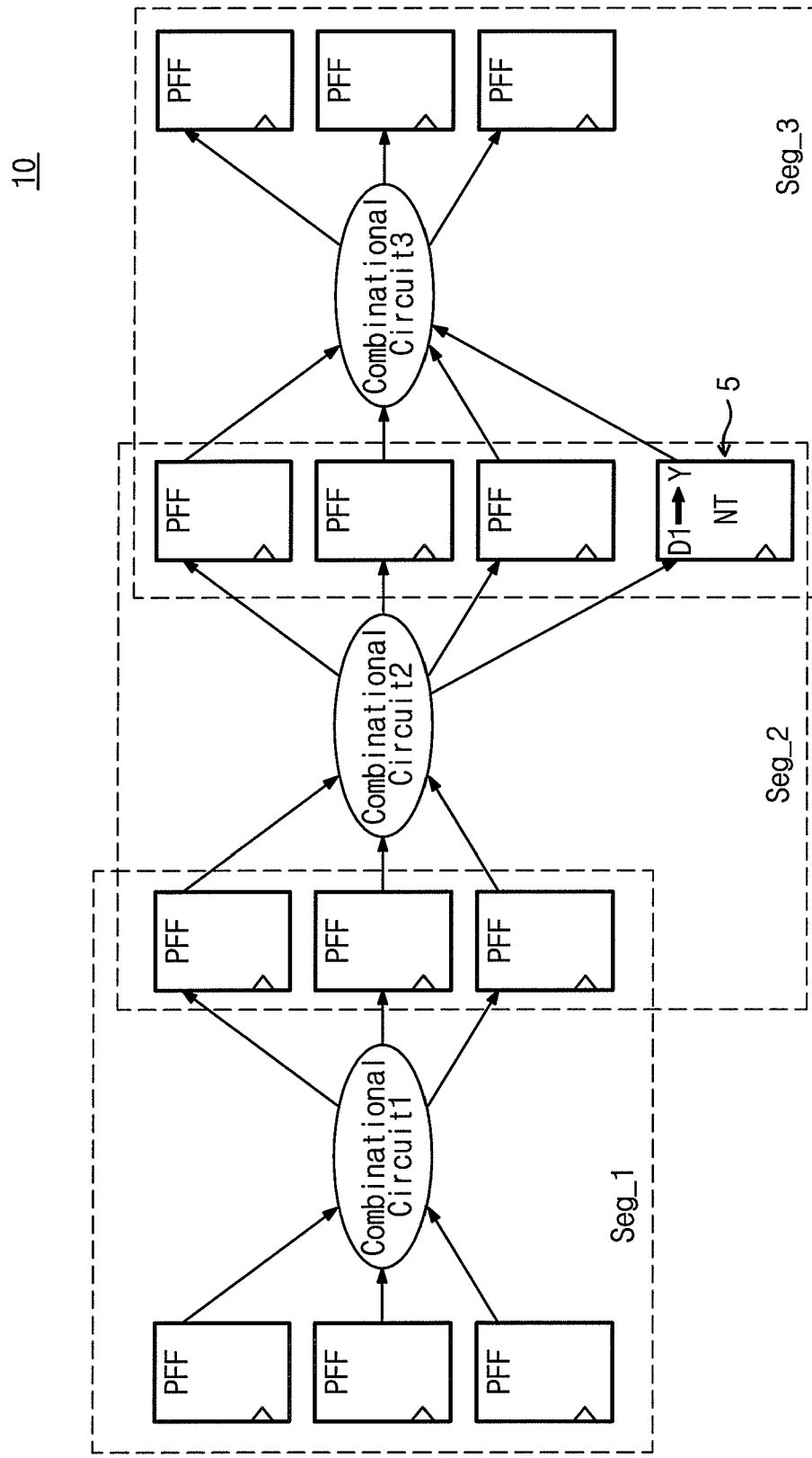
FIG. 3 is a block diagram of a DUT illustrated in FIG. 1.

FIG. 3 is a block diagram of the DUT 10 illustrated in FIG. 1.

Referring to FIG. 3, the DUT 10 includes a plurality of combinational circuits and a plurality of flip-flops. The DUT 10 is segmented into spaces, e.g., a first segment Seg_1, a second segment Seg_2 and a third segment Seg_3. The first segment Seg_1 has no external connection, which is defined as a hard segment. The second segment Seg_2 and the third segment Seg_3 have a signal line crossing a boundary therebetween, which are defined as soft segments. For spatial segmentation, the DUT is constructed in units of hard segments. Accordingly, a net tracer (NT) 5 is inserted in the signal line to make the soft segment into the hard segment.

By adding virtual flip-flops (PFFs) with virtual input/output to the soft segments, the DUT is constructed only with the hard segments. A multiplexed flip-flop may be used as the PFF. For the PFF, a multiplexer (MUX) is used to form a path for discriminating between a normal operation and a debugging operation. In the debugging operation, the PFFs form a chain to extract a value inputted in the normal operation.

Figure 4:
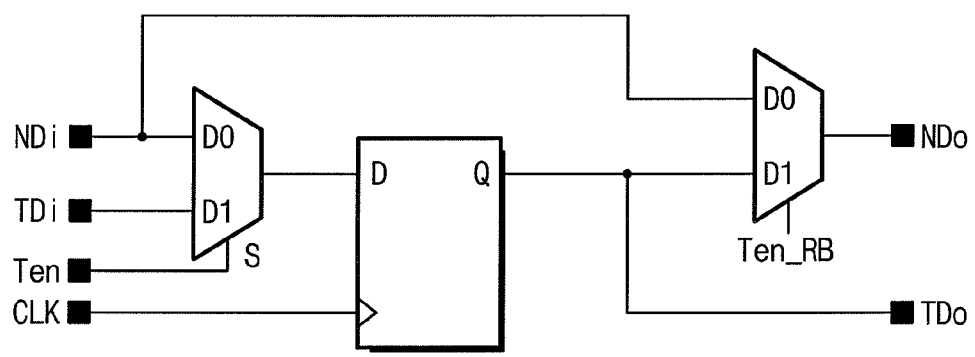
FIGS. 4 and 5 illustrate the structure and symbol of an NT illustrated in FIG. 3.
Figure 5:
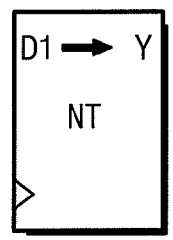

FIGS. 4 and 5 illustrate the structure and symbol of the NT 5 illustrated in FIG. 3, respectively.

Referring to FIG. 4, the NT 5 is used to extract the state value of a net of the DUT 10, which is a data path except the flip-lops. The NT 5 is used to extract the state value of a net of a design circuit, to input a corrected state value into the net, or to input the previous state value of the net.

For example, in order to extract the state value of a net in the DUT 10, similar to a method of forming a chain connecting a TDi and a TDo in the JTAG to extract debugging data, the emulation calculator 20 activates a "Ten" signal and extracts the state value of the flip-flop through the TDo.

In order to correct and input the state value of a net in the DUT 10 or to input the previous state value of the net in the DUT 10, the emulation calculator 20 activates the "Ten" signal and sets a "Ten_RB" signal to "1" to input the state value of the net through the TDi and to output the resulting value through an NDo.

Figure 6:
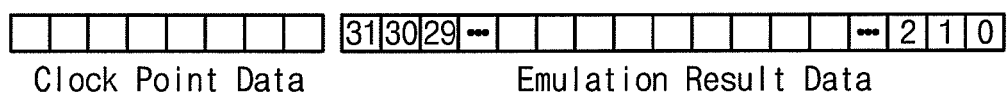
FIG. 6 illustrates the format of emulation data illustrated in FIG. 1.

FIG. 6 illustrates the format of emulation data illustrated in FIG. 1.

Referring to FIGS. 1 and 6, emulation data 25 includes clock point data and emulation result data. The clock point data has information for reporting a clock frequency and a change in the clock frequency so that the DUT 10 is time-independent. The emulation result data includes the state values of the NT and the PFF so that the DUT 10 is space-independent.

Emulation data 25 stored in each computer is one-to-one matched with the emulation storage unit 40. Accordingly, the emulation data 25 need not to have the position information of the storage unit. If there is emulation data 25 generated by two or more other clocks, the emulation system 100 transfers the emulation data 25 to the computer 300 at every cycle.

Figure 7:
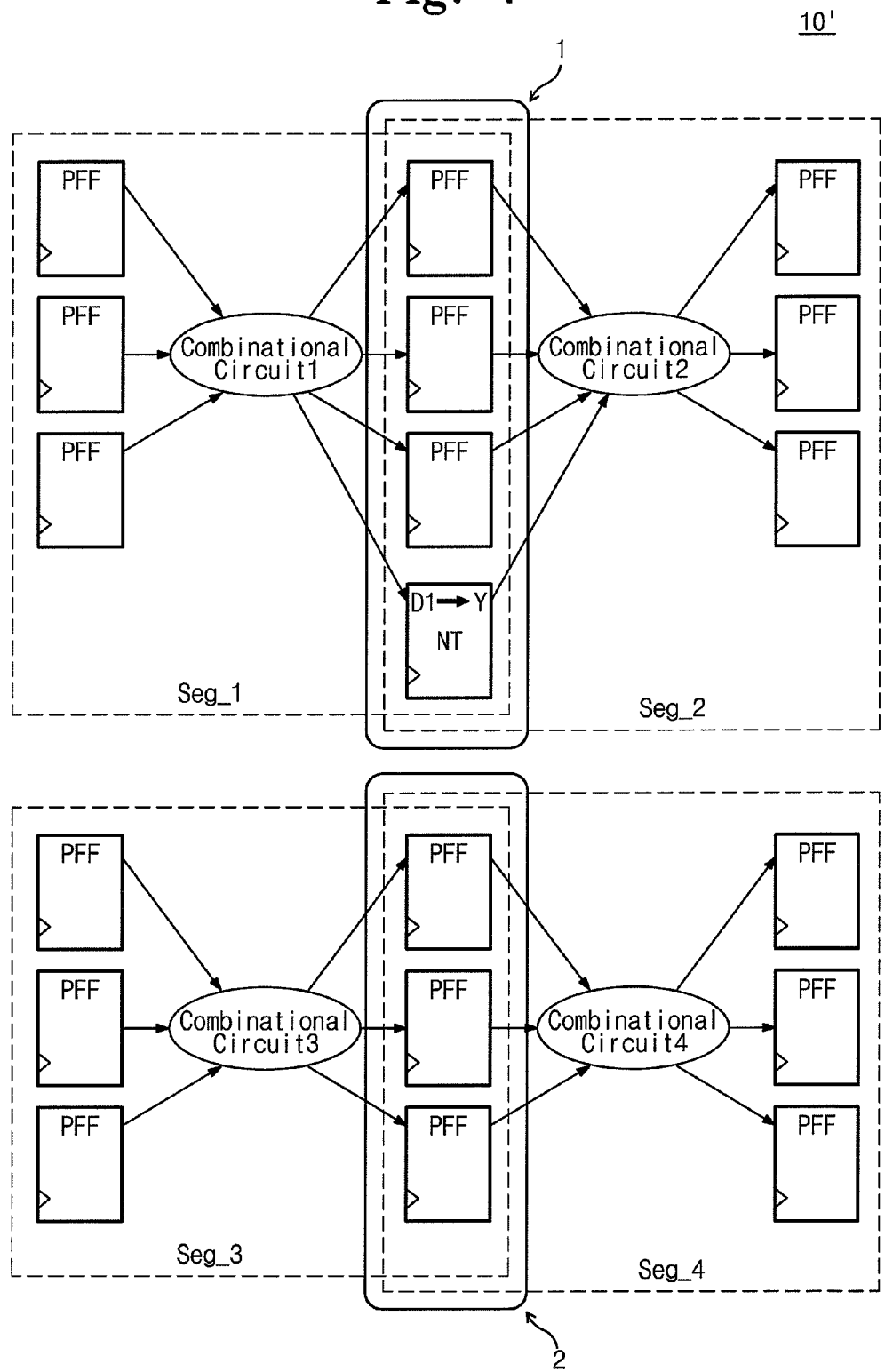
FIG. 7 illustrates the segments of the DUT illustrated in FIG. 1.

FIG. 7 illustrates the segments of a DUT 10', similar to the DUT 10 illustrated in FIG. 1.

Referring to FIGS. 1 and 7, the emulation storage unit 40 stores emulation result data in units of segments. Because the computers 300 store emulation result data and clock-related information in units of segments, each computer 300 can perform debugging or simulation for a predetermined time in units of segments.

If the emulation result data of a first segment Seg_1 and the emulation result data of a second segment Seg_2 are stored respectively in the first computer and the second computer, the state value "1" of the NT and the PFF overlapping with the first segment Seg_1 and the second segment Seg_2 is stored in the first computer and the second computer. Accordingly, for time/space-dependent emulation, the first computer performs debugging and simulation on the first segment Seg_1 and the second computer performs debugging and simulation on the second segment Seg_2.

The above description can be similarly applied to the third computer storing the state value "2" of the PFF of a third segment Seg_3 and the fourth computer storing the state value "2" of the PFF of a fourth segment Seg_4, and thus their description will be omitted for conciseness.

Figure 8:
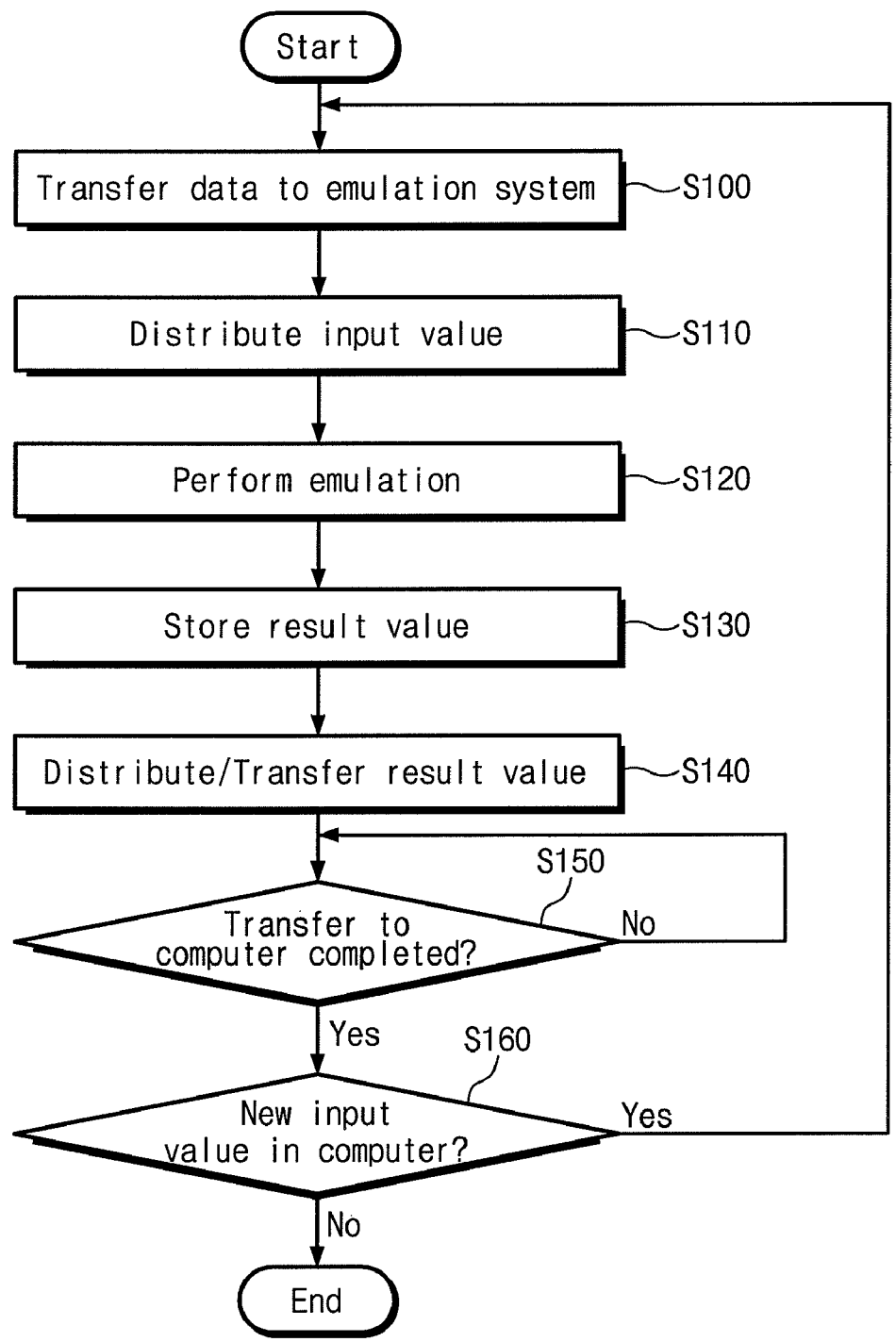
FIG. 8 is a flowchart illustrating an operation of the emulation system illustrated in FIG. 1.

FIG. 8 is a flowchart illustrating an operation of the emulation system 100 illustrated in FIG. 1.

Referring to FIGS. 1 and 8, the computer 300 transfers the input data of the DUT 10 through the interface unit 50 to the emulation storage unit 40 in block S100. In block S110, the controller 30 distributes input values corresponding to the segments of the DUT 10.

In block S120, the emulation calculator 20 performs emulation on the DUT 10. In block S130, the emulation calculator 20 stores emulation data 25 in the emulation storage unit 40 under the control of the controller 30. In block S140, the controller 30 transfers the emulation data 25 in the emulation storage unit 40 through the interface unit 50 to the computer 300.

In block S150, the controller 30 determines if the transfer of the emulation data 25 to the computer 300 is completed. If the transfer of the emulation data 25 to the computer 300 is completed, the controller 30 proceeds to block S160; and if the transfer of the emulation data 25 to the computer 300 is not completed, the controller 30 repeats block S150.

In block S160, the controller 30 determines if a new input value is transferred from the computer 300 to the emulation system 100. If a new input value is transferred from the computer 300 to the emulation system 100, the operation returns to block S100; and if a new input value is not transferred from the computer 300 to the emulation system 100, the operation is ended.

When the state values of the NT and all the flip-flops of the DUT are extracted, the size of the emulation result data for every cycle of the emulation is typically about several tens of K bytes to several M bytes. Accordingly, when the state value data are to be transferred to the computer at every cycle, even though PCI2.0 is used for a high-speed interface with the computer, a data rate of 66 MHz is provided with 64 bits for each cycle. For example, an emulation speed of about 60.8 KHz needs to be provided for transfer of 32,000-bit data. Therefore, in the case of an emulation system that can start the next cycle only after completion of transfer of state value data to a computer for each cycle, a data transfer rate determines the speed of the emulation system.

In order to increase an emulation speed, instead of transferring emulation data at every cycle, emulation data may be cumulatively stored in an internal memory of an emulator and the cumulatively stored emulation data may be simultaneously transferred to a computer. Because the internal memory of the emulator is limited in size, a large amount of emulation data cannot be stored in actual applications. Accordingly, the emulation data need to be transferred to the computer at every cycle or at every few cycles in order to reduce the size of the internal memory of the emulator. In order to efficiently use the small-size memory of the emulation system, it is preferable to substitute an emulation I/O distributor for the emulation storage unit.

Figure 9:
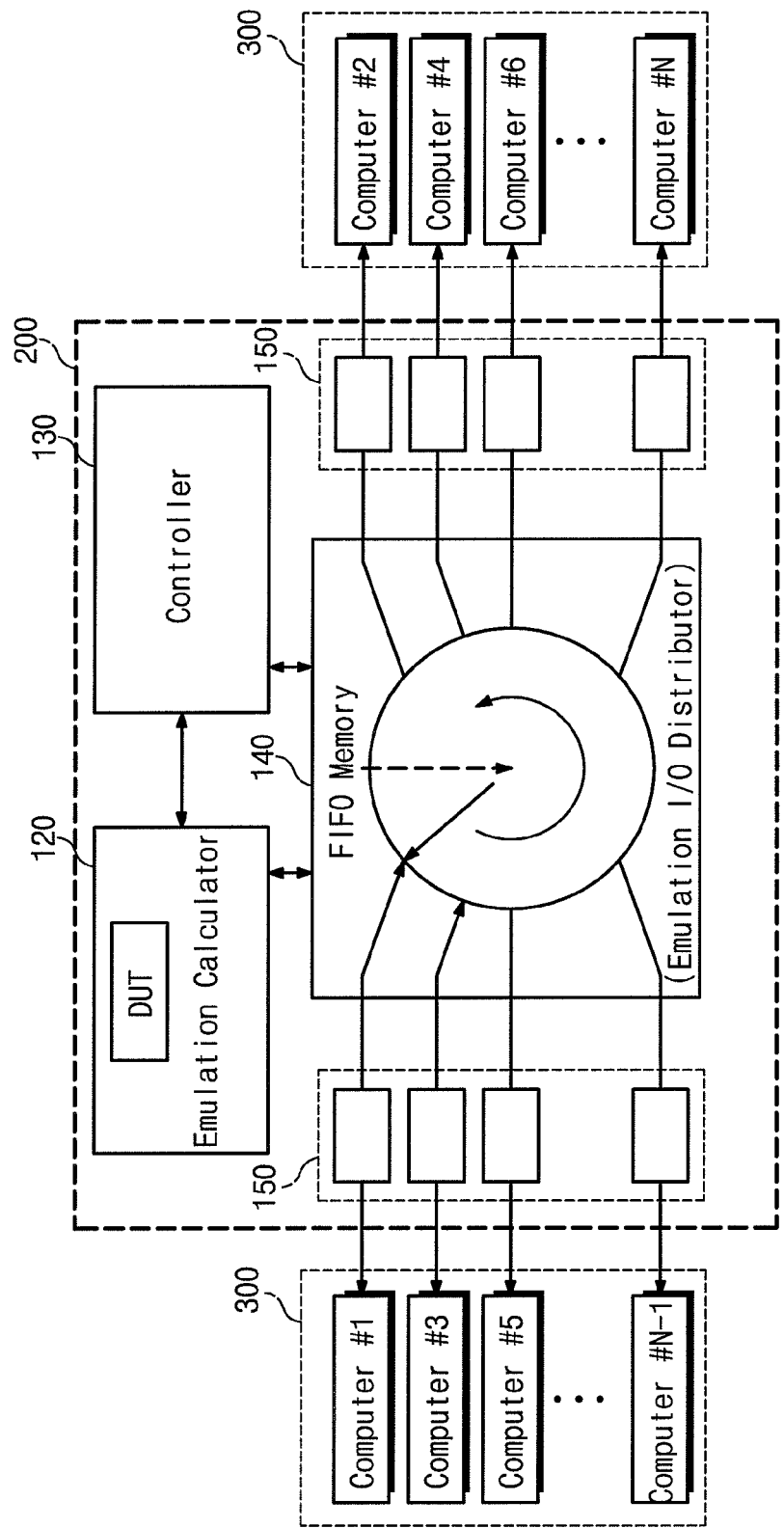
FIGS. 9 and 10 are block diagrams of an emulation system according to another embodiment of the present invention.
Figure 10:
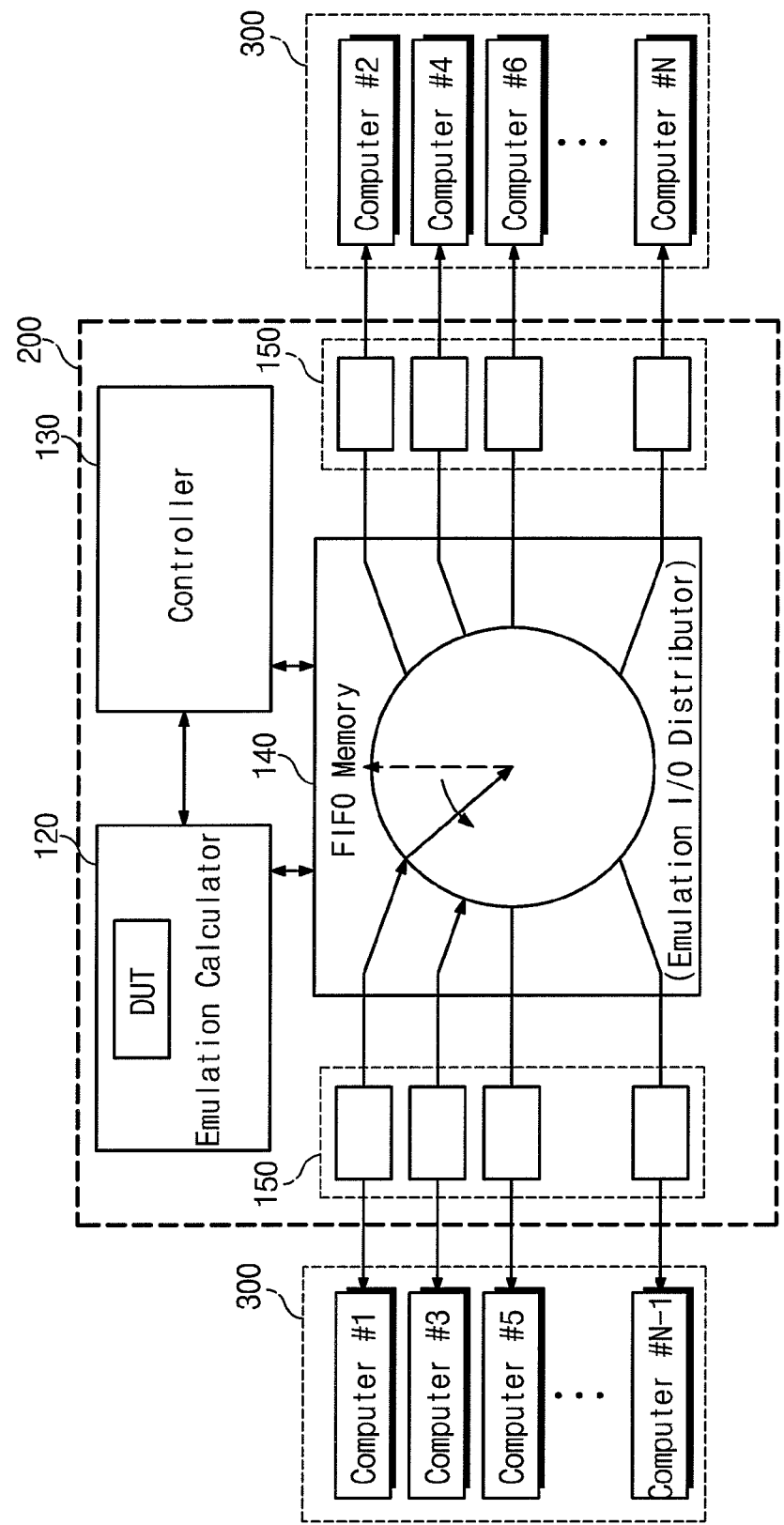

FIGS. 9 and 10 are block diagrams of an emulation system according to another embodiment of the present invention.

Referring to FIGS. 9 and 10, an emulation I/O distributor 140 is substituted for the emulation storage unit 40 illustrated in FIG. 1. The emulation I/O distributor 140 includes a first-in-first-out (FIFO) memory and a time-driven module (TDM).

Emulation data stored in an emulation calculator 120 are stored in the FIFO memory under the control of a controller 130. The emulation data stored in the FIFO memory are distributed by the TDM and transferred to an interface unit(s)

150. The emulation data stored in the interface unit(s) 150 are transferred to a computer 300 under the control of the controller 130.

To this end, a user circuit (or a DUT) of the emulation system is divided into segments so that it is space-independent. In addition, emulation data contains clock-related information so that the user circuit is time-independent. Accordingly, the emulation system constructs emulation data to be time/space-independent, and distributes and transfers the time/space-independent emulation data to two or more computers distributedly. Therefore, the computer storing the distributed emulation data can perform debugging or simulation independently and also can increase the operation speed of the emulation system.

In addition, the emulation I/O distributor makes it possible to transfer many emulation data from the emulation system to the external computer using the a small amount of memory in the emulation system.

As described above, the present invention emulates the user circuit in a time/space independent manner and transfers the emulation result data to computers, thereby reducing the data transfer time and thus the operation speed of the emulation system. Accordingly, the debugging time and the verification time for the design circuit can be reduced effectively.

In addition, distributed computers including the user circuit store the time/space-independent emulation data, thereby making it possible to perform debugging or simulation independently.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An emulation system comprising:
   a controller;
   an emulation calculator including a device under test (DUT) and emulating the DUT;
   an emulation storage unit storing emulation data of the DUT emulated by the emulation calculator under the control of the controller, wherein stored emulation data includes clock point data and emulation result data; and
   an interface unit simultaneously transferring the stored emulation data to a plurality of computers under the control of the controller, wherein the plurality of computers independently operate on the stored emulation data of the DUT on the basis of at least one of the clock point data and the emulation result data,
   wherein the DUT is divided into a plurality of hard segments, and
   wherein the hard segments have no external connection.

2. The emulation system of claim 1, wherein the emulation calculator extracts the emulation data from the hard segments.

3. The emulation system of claim 2, wherein the emulation calculator adds the extracted emulation data and clock information.

4. The emulation system of claim 2, wherein the emulation storage unit comprises a plurality of storage units corresponding to the hard segments.

5. The emulation system of claim 4, wherein the interface unit comprises a plurality of interfaces corresponding to the storage units.

6. The emulation system of claim 4, wherein the emulation data stored in the storage units are transferred through the corresponding interfaces to the corresponding computers.

7. The emulation system of claim 1, wherein state values of the hard segments adjacent to each other are stored respectively in different computers of the plurality of computers.

8. The emulation system of claim 1, wherein the controller receives input values from the computers, stores the received input values in the interface unit and the emulation storage unit, and distributes the stored input values to the emulation calculator.

9. The emulation system of claim 1, wherein the emulation calculator emulates the DUT, stores the emulation data in the emulation storage unit, and transfers the emulation data through the interface unit to the computers.

10. The emulation system of claim 1, wherein the computers receive the emulation data to perform one of time-independent debugging and time-independent simulation.

11. The emulation system of claim 1, wherein the computers receive the emulation data to perform one of space-independent debugging and space-independent simulation.

12. The emulation system of claim 1, wherein the emulation storage unit is an emulation I/O distributor.

13. The emulation system of claim 12, wherein the emulation I/O distributor comprises:
    an I/O distributor; and
    a memory storing the emulation data and transferring the stored emulation data to the interface unit under the control of the I/O distributor.

14. A non-transitory computer readable medium embodying instructions executable by a processor to perform a method for analyzing a device under test (DUT) divided into a plurality of hard segments, the method steps comprising:
    extracting emulation data from the hard segments by an emulation calculator;
    storing the emulation data of the DUT emulated by the emulation calculator under the control of a controller; and
    transferring, simultaneously, the emulation data to a plurality of computers under the control of the controller, wherein the plurality of computers operate independently on the emulation data,
    wherein the hard segments have no external connection.

15. The computer readable medium of claim 14, further comprising storing state values of the segments adjacent to each other in different computers of the plurality of computers, respectively.

16. The computer readable medium of claim 14, further comprising receiving input values from the computers, storing the received input values, and distributing the stored input values to the emulation calculator.

17. The computer readable medium of claim 14, wherein the computers receive the emulation data to perform one of time-independent debugging and time-independent simulation.

18. The computer readable medium of claim 14, wherein the computers receive the emulation data to perform one of space-independent debugging and space-independent simulation.

19. The computer readable medium of claim 14, wherein transferring the emulation data further comprises distributing the emulation data to a plurality of computers.

* * * * *